Nov. 26, 1968    R. B. McFIGGANS    3,412,632
DIFFERENTIAL MECHANISM
Filed Sept. 23, 1966

INVENTOR.
Robert B. McFiggans
BY Martin O. Wittstein
ATTORNEY

United States Patent Office 3,412,632
Patented Nov. 26, 1968

3,412,632
DIFFERENTIAL MECHANISM
Robert B. McFiggans, Stamford, Conn., assignor to Pitney-Bowes, Inc., Stamford, Conn., a corporation of Delaware
Filed Sept. 23, 1966, Ser. No. 581,562
1 Claim. (Cl. 74—714)

ABSTRACT OF THE DISCLOSURE

A compact spur gear differential made up of five parts including a body member having recesses provided therein for carrying planet gears supported by their toothed extremities and radial flanges on the sun gears utilized to prevent axial movement of the planets within their respective recesses.

This invention relates generally to motion transmitting devices, and more particular to improvements in differential mechanisms.

Differential mechanisms of the type to which the present invention pertains have found wide application in the motion transmitting art and have become highly complex in construction and very expensive to manufacture and assemble. Although these mechanisms have a high degree of accuracy in transmitting motion from an input source and delivering a differential motion to an output location, they customarily entail a large number of parts requiring very precise machining and a number of manufacturing steps in the assembly of an individual mechanism. They are generally constructed of material capable of handling large loads at high speed without failure of parts and accordingly the manufacturing costs of these mechanisms are affected by these requirements.

A principal object of the present invention is to provide a differential mechanism which avoids the disadvantages of prior art structures and yet meets the requirements of such a mechanism for limited special purpose applications.

Another object of the present invention is to provide a relatively simple differential mechanism which is very economical to manufacture and assemble and yet provides the significant functions of a more complex and expensive mechanism.

Still another object of the present invention is to provide a differential mechanism which requires a minimum number of parts and in which the parts are designed so that they can all be made of the same material, preferably by the same manufacturing techniques, and readily assembled together with a minimum of effort or equipment.

A further object of the present invention is to provide a simple and very inexpensive differential mechanism which is particularly adapted to applications involving relatively low input loads and operating speeds, and where a high degree of precision is not required.

In its broader aspects, the mechanism of the present invention is preferably a five piece unit comprising generally a body member, preferably solid, having a pair of spaced apart side walls through which an axis of rotation for the body member passes, a rotary motion transfer means supported by the body member which preferably is a pair of planetary gears peripherally supported by recesses in the body member such that the gears are disposed completely eccentric of the axis of rotation of the body member, are engaged in driving relationship interiorly of the body member and have portions projecting outwardly of the side walls of the body member. Additional rotary motion transfer means, preferably in the form of sun gears, are disposed adjacent to but outwardly of the side walls and coaxially with the axis of rotation of the body member and are engaged in driving relationship with the outwardly projecting portion of the planetary gears. Preferably the parts are held together in assembled relationship by a shaft disposed coaxially with the axis of rotation of the body member.

Further objects and advantages of the present invention will be more readily apparent from an understanding of the following detailed description of one embodiment of the invention when considered in conjunction with the accompanying drawings, in which.

Figure 1:
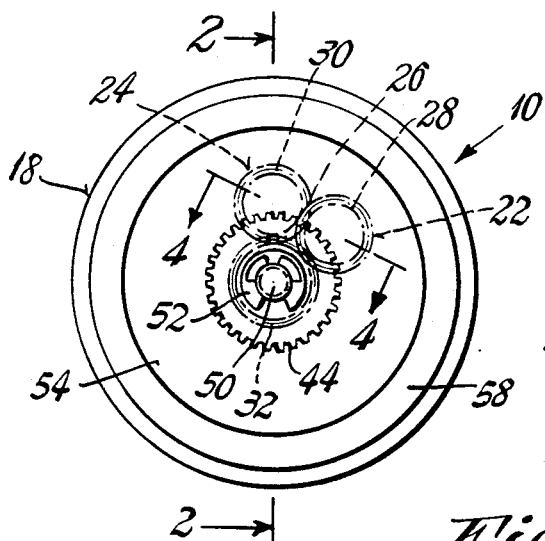
FIG. 1 is a side elevation of the mechanism of the present invention.
Figure 2:
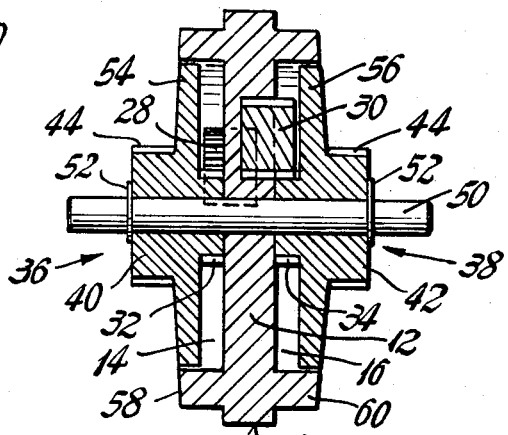
FIG. 2 is a vertical sectional view taken on the line 2—2 of FIG. 1.

In the drawings, the numeral 10 designates generally the differential mechanism of the present invention which comprises a body member 12 which is generally solid and is formed as a disc having spaced parallel side wall 14 and 16, a periphery 18 and an axis of rotation which passes through the side walls 14 and 16, and in the illustrated embodiment is constituted by the geometric central axis of the disc 12. It will be understood that the body member 12 may have any desired shape or cross sectional configuration so long as it has at least a pair of spaced apart side walls and an axis of rotation passing therethrough. The disc 12 is provided with a central aperture 20 which is coaxial with the axis of rotation.

Figure 3:
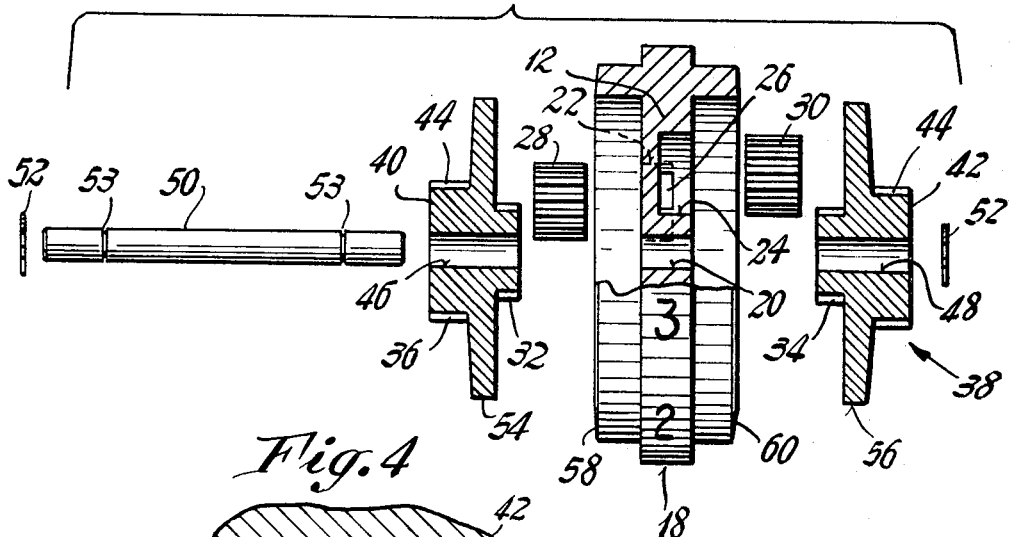
FIG. 3 is an exploded, partly sectional view of the components of the mechanism.

The disc 12 is further provided with a pair of circular recesses 22 and 24, one each of which extends inwardly from each side wall 14 and 16 respectively for a depth sufficient that the recesses overlap by a small amount in the axial direction of the recesses as indicated by the numeral 26 in FIG. 3. As best seen in FIG. 1, each recess 22 and 24 is disposed completely eccentric of the axis of rotation of the disc 12 so that as the latter rotates on said axis, the recesses 22 and 24 orbit around the axis.

The recesses 22 and 24 are also disposed in juxtaposition so as to have the periphery of one overlap the periphery of the other which also occurs in the location indicated by the numeral 26 in FIG. 3 where the recesses overlap in the axial direction.

Rotary motion transfer means are carried by the disc 12 so as to transmit rotary motion from one side of the disc 12 to the other. Thus, a pair of planetary gears 28 and 30 are loosely received in the recesses 22 and 24 respectively, each gear having an outside diameter which is substantially equal to, or very slightly smaller than the diameter of the recess in which each gear is received. Thus each gear is supported around its tooth periphery by the inner annular surface of the recess, thereby avoiding the necessity for axles, bearings and external supports for the gears 28 and 30.

Figure 4:
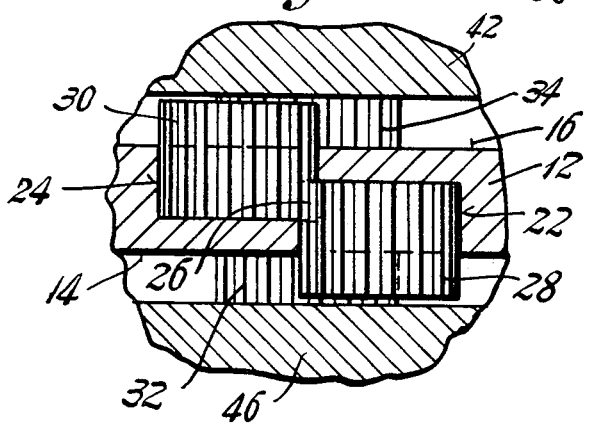
FIG. 4 is a fragmentary sectional view drawn to an enlarged scale taken on the line 4—4 of FIG. 1.

The gears 28 and 30 mesh with each other in the overlapping portion 26 of the recesses as best seen in FIG. 4, whereby rotary motion imparted to one gear is transferred to the other.

Additional space apart rotary motion transfer means are provided for imparting a motion input to either of the gears 28 or 30, or to provide a differential motion output. Thus, a pair of sun gears 32 and 34 are disposed in juxtaposition to the side walls 14 and 16 respectively of the disc 12 so as to mesh with that portion of the gears 28 and 30 which projects beyond the side walls 14 and 16. The gears 32 and 34 are also disposed so as to be coaxial with the axis of rotation of the disc 12.

While any convenient mechanical connection of the gears 32 and 34 may be provided, the gears, as shown, are preferably formed integrally with end plates 36 and 38, each of which has a central boss 40 and 42 respectively which are provided with teeth 44 for driving purposes.

Each end plate 36 and 38 is provided with a bore 46 and 48 respectively, and a shaft 50 is received through the bores 46 and 48, and the bore 20 of the disc 12. A pair of retaining rings 52 engage in grooves 54 provided on the shaft 50 with a snap fit to hold all the parts in assembled relationship.

The end plates 36 and 38 further comprise radially extending flanges 54 and 56 respectively which serve to maintain the gears 28 and 30 in their respective recesses in the disc 12. The latter is provided with annular axially projecting flanges 58 and 60 which overlie the outer edges of the flanges 54 and 56 whereby the interior of the mechanism is substantially enclosed to prevent foreign matter from entering into and interfering with smooth operation of the several gears.

Preferably all of the parts are made from a suitable plastic material which has sufficient strength for the purpose intended, is self-lubricating and can be injection molded or extruded, thereby eliminating expensive machining procedures often encountered with precision metal parts.

While the periphery 18 of the disc 12 has been shown with numerical indicia thereon so that the disc constitutes a selectively settable input or a quantity indicating output, it should be understood that the periphery may be provided with teeth so that a continuous drive may be imparted thereto or derived therefrom, as the case may be. Also, either of the end plates 36 or 38 or the disc 12 may be made fast to the shaft 50 and the latter utilized as a location of motion input or output.

It will now be seen that the above described construction is greatly simplified relative to prior art constructions of similar devices and yet performs substantially all of the functions of such prior art devices. Since the gears 28 and 30 are received within the recesses 22 and 24 and rotate therein, there is no need for external bushings, bearings, axles, etc., and the gears themselves may be formed by extruding the gear to final shape and subsequently cutting the extrusion to desired gear width. In addition, since there are no axles to be supported by separate side plates of a central shell as in the case of many prior art devices, the disc 12 may be formed by injection molding as a substantially solid born to shape piece with no further assembly necessary to render it operable in the differential mechanism.

It will be apparent to those skilled in the art that operation of the mechanism above described is kinematically the equivalent of many well known differential mechanisms in that the direction, rate and location of motion output is a function of the direction, rate and location of motion input. Thus, in the illustrated embodiment, if the disc 12 is maintained stationary and one of the sun gears 32 or 34 is rotated, the other sun gear will rotate with the same velocity but in the opposite direction. If one of the sun gears 32 or 34 is held stationary and the other sun gear is rotated, the disc 12 will rotate in the same direction with one half the velocity of the rotating gear 32 or 34. Conversely, if one of the gears 32 or 34 is held stationary and the disc 12 is rotated, the other sun gear will rotate in the same direction with twice the velocity of the disc 12. Finally, if motion input is applied simultaneously to two of the three possible locations, a motion output is derived at the third location which bears a relation to the two motion inputs in accordance with well known mathematical formulae which need not be herein further explained.

It will be apparent from the foregoing that there is provided a differential mechanism which avoids the disadvantages of prior art structures and achieves the foregoing objects. It is to be understood that the embodiment of the invention described above and shown in the accompanying drawings is merely illustrative of the best mode presently contemplated for carrying out the invention and is susceptible to modification of size, form, location and arrangement of parts, the invention being intended to cover all variations and equivalents as may be deemed to be within the scope of the appended claim.

I claim:
1. A differential mechanism comprising:
(A) a substantially solid circular disc-like body member having spaced apart parallel side walls, a central bore defining an axis of rotation passing through said side walls, and oppositely projecting annular flanges disposed adjacent the periphery of said body member and extending axially beyond said side walls,
(B) a circular recess extending inwardly from each of said side walls, each of said recesses:
  (1) having a depth sufficient to slightly overlap the other in the axial direction, and
  (2) being disposed eccentrically of said axis of rotation and juxtaposed to have the periphery of one slightly overlap the periphery of the other,
(C) a planetary gear loosely received in each recess, each gear
  (1) having an outside diameter substantially equal to the diameter of the recess in which it is received so that the teeth of said planetary gears make bearing contact with the peripheral surface of said recesses, and
  (2) extending from the inner surface of its associated recess to a point beyond the adjacent one of said side walls whereby said planetary gears mesh in the overlapped portions of said recesses,
(D) a sun gear disposed adjacent each of said side walls coaxially with said axis of rotation of said body member, each sun gear
  (1) meshing with one of said planetary gears on the portion thereof which projects beyond said side walls, and
  (2) having a radially projecting flange extending substantially to the inner peripheral surface of said axially projecting flanges of said body member, the inner surface of each flange being disposed substantially in contact with the outer end of an adjacent planetary gear whereby said planetary gears can freely rotate in said recesses but are constrained against axial shifting by said flanges,
(E) means holding said body member and all said gears in assembled relationship, and
(F) means for imparting a motion input selectively to one or both of said sun gears, to said body member, or to one of said sun gears and said body member whereby to derive a differential output from said body member or the free one of said sun gears depending upon the selection of motion input location.

References Cited

UNITED STATES PATENTS

| | | | |
|---|---|---|---|
| 410,425 | 9/1889 | Matthews | 74—714 |
| 754,914 | 3/1904 | Bayley | 74—714 |
| 1,030,379 | 6/1912 | Benson | 74—714 X |
| 1,435,821 | 11/1922 | Dorsey | 74—802 X |
| 2,453,342 | 11/1948 | Rast | 74—802 X |
| 2,918,830 | 12/1959 | O'Leary | 74—714 X |

FRED C. MATTERN, Jr., *Primary Examiner.*

THOMAS C. PERRY, *Assistant Examiner.*